United States Patent [19]

Idei et al.

[11] Patent Number: 5,589,750
[45] Date of Patent: Dec. 31, 1996

[54] ACCELERATION/DECELERATION CONTROL APPARATUS FOR NUMERICAL CONTROL APPARATUS

[75] Inventors: Takashi Idei; Shoichi Sagara, both of Minamitsuru-gun; Kentaro Fujibayashi, Musashino, all of Japan

[73] Assignee: Fanuc Ltd., Yamanashi, Japan

[21] Appl. No.: 307,808

[22] PCT Filed: Jan. 26, 1994

[86] PCT No.: PCT/JP94/00106

§ 371 Date: Sep. 28, 1994

§ 102(e) Date: Sep. 28, 1994

[87] PCT Pub. No.: WO94/19730

PCT Pub. Date: Sep. 1, 1994

[30] Foreign Application Priority Data

Feb. 23, 1993 [JP] Japan .................................. 5-032921

[51] Int. Cl.$^6$ .................................................. G05B 19/416
[52] U.S. Cl. .................... 318/573; 318/569; 318/626
[58] Field of Search ........................ 318/567, 569, 318/570, 571, 574, 600, 601, 626, 268, 269, 270, 271, 276, 277, 278, 279, 568.15, 568.18, 573

[56] References Cited

U.S. PATENT DOCUMENTS

| | | | |
|---|---|---|---|
| 3,876,873 | 4/1975 | Slawson | 318/571 X |
| 3,952,238 | 4/1976 | Cutler | 318/571 |
| 4,092,887 | 6/1978 | Bromer. | |
| 4,644,237 | 2/1987 | Frushour et al. | 318/313 |
| 4,894,594 | 1/1990 | Kawamura et al. | 318/567 |
| 5,073,748 | 12/1991 | Boehm | 318/569 |

FOREIGN PATENT DOCUMENTS

| | | |
|---|---|---|
| 2628961 | 12/1977 | Germany. |
| 54-44174 | 4/1979 | Japan. |
| 59-16008 | 1/1984 | Japan. |
| 61-40612 | 2/1986 | Japan. |
| 62-94288 | 4/1987 | Japan. |
| 62-184505 | 8/1987 | Japan. |
| 5-333914 | 12/1993 | Japan. |

*Primary Examiner*—Bentsu Ro
*Attorney, Agent, or Firm*—Staas & Halsey

[57] ABSTRACT

An acceleration/deceleration control apparatus for a numerical control apparatus which controls a tool in a vicinity of a stroke end by making maximum use of a stroke. The tool moves along a locus in an in-stroke region surrounded by a stroke end and carries out machining of a workpiece such as cutting and the like. The tool, which is moved by the numerical control apparatus according to a machining program, starts from a start point and moves up to an end point in accordance with preread machining blocks. The tool moves in response to usual feed speed control except that tool feed speed is decelerated in sections of the machining blocks when the tool approaches the stroke end. The tool feed speed is controlled to a minute speed just before the tool reaches the boundary of the stroke end and maintains the minute speed while moving along the stroke end. The tool is then accelerated after moving from the stroke end and returns to usual feed speed control.

6 Claims, 5 Drawing Sheets

ACCELERATION/DECELERATION CONTROL APPARATUS FOR NUMERICAL CONTROL APPARATUS

TECHNICAL FIELD

The present invention relates to an acceleration/deceleration control apparatus for a numerical control apparatus, and more specifically, to an acceleration/deceleration control apparatus for a numerical control apparatus for carrying out acceleration/deceleration control of a tool in the vicinity of a stroke end.

BACKGROUND ART

Conventionally, a numerically controlled machine tool is arranged such that when a tool is about to move beyond a stroke end set by a limit switch of a machine tool or when the tool is about to enter a prohibited region of a stored stroke limit designated by a program or setting data, an error code is displayed as well as the tool is decelerated and stopped.

Nevertheless, according to this method, since the tool cannot stop at the stroke end if a sufficient distance necessary for deceleration and stopping is not set, a region in which machining can be carried out is set smaller than the size of a stroke. That is, there is a problem in that the region in which machining can be carried out is restricted smaller than a region set by an intrinsic stroke end of a machine tool.

SUMMARY OF THE INVENTION

Taking the above into consideration, an object of the present invention is to provide an acceleration/deceleration control apparatus for a numerical control apparatus capable of moving a tool by making a maximum use of a stroke.

To solve the above problem, according to the present invention, there is provided an acceleration/deceleration control apparatus for a numerical control apparatus for carrying out acceleration/deceleration control of a tool in the vicinity of a stroke end, which comprises stroke end determination means for determining whether or not the tool moves beyond the stroke end based on a preread machining block, and tool feed speed control means for controlling a feed speed of the tool so that the feed speed of the tool is made to a minute speed in the vicinity of the stroke end when the stroke end determination means determines that the tool moves beyond the stroke end.

The stroke end determination means determines whether or not the tool moves beyond the stroke end based on a preread machining block. When the stroke end determination means determines that the tool moves beyond the stroke end, tool feed speed control means controls the feed speed of the tool so that the tool moves at minute speed in the vicinity of the stroke end. The feed speed of the tool is then controlled according to the control and the tool moves at the minute speed in the vicinity of the stroke end.

As a result, the tool does not go across the stroke end and moves in the region within the stroke end at all times. Consequently, the tool can be moved by making maximum use of the stroke without restricting the stroke end to a small region.

BEST MODE FOR CARRYING OUT THE INVENTION

An embodiment of the present invention will be described below with reference to the drawings.

Figure 2:
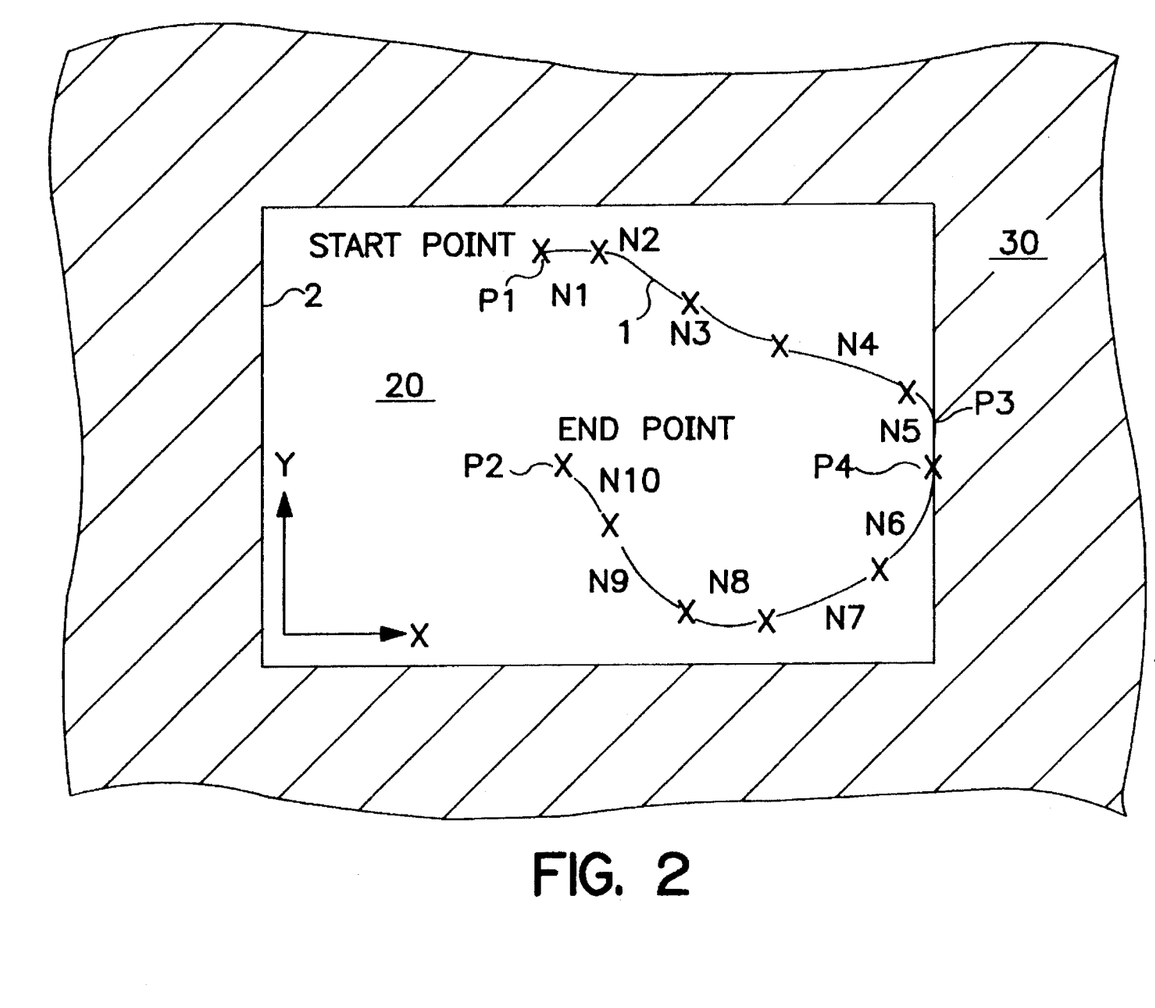
FIG. 2 is a view explaining feed of a tool according to the present invention.

FIG. 2 is a view explaining feed of a tool according to the present invention. In FIG. 2, a stroke end 2 defines a border of movement of a tool mounting axis of a numerically controlled machine tool. A region beyond the stroke end 2 is set as a prohibited region 30. A tool moves along a locus 1 in an in-stroke region 20 surrounded by the stroke end 2 and carries out machining of a workpiece such as cutting and the like. The tool, which is moved by a numerical control apparatus according to a machining program, starts from a start point P1 and moves up to an end point P2 according to machining blocks N1, N2, ... , N10.

The tool moves based on a usual feed speed control except in the sections of the machining blocks N5, N6. A feed speed of the tool is decelerated in the section of the machining block N5 where the tool approaches the stroke end 2 and is controlled to a minute speed. The tool, whose feed speed is controlled to the minute speed just before the tool reaches the point P3 of the stroke end 2, comes into contact with the stroke end 2 at the point P3 and moves along the stroke end 2 and then leaves the stroke end 2 at a point P4. The tool is accelerated again in the section of the machining block N6 and returns to the usual feed speed control. Next, a deceleration distance and an acceleration constant when the tool approaches the stroke end 2 will be described.

Figure 3:
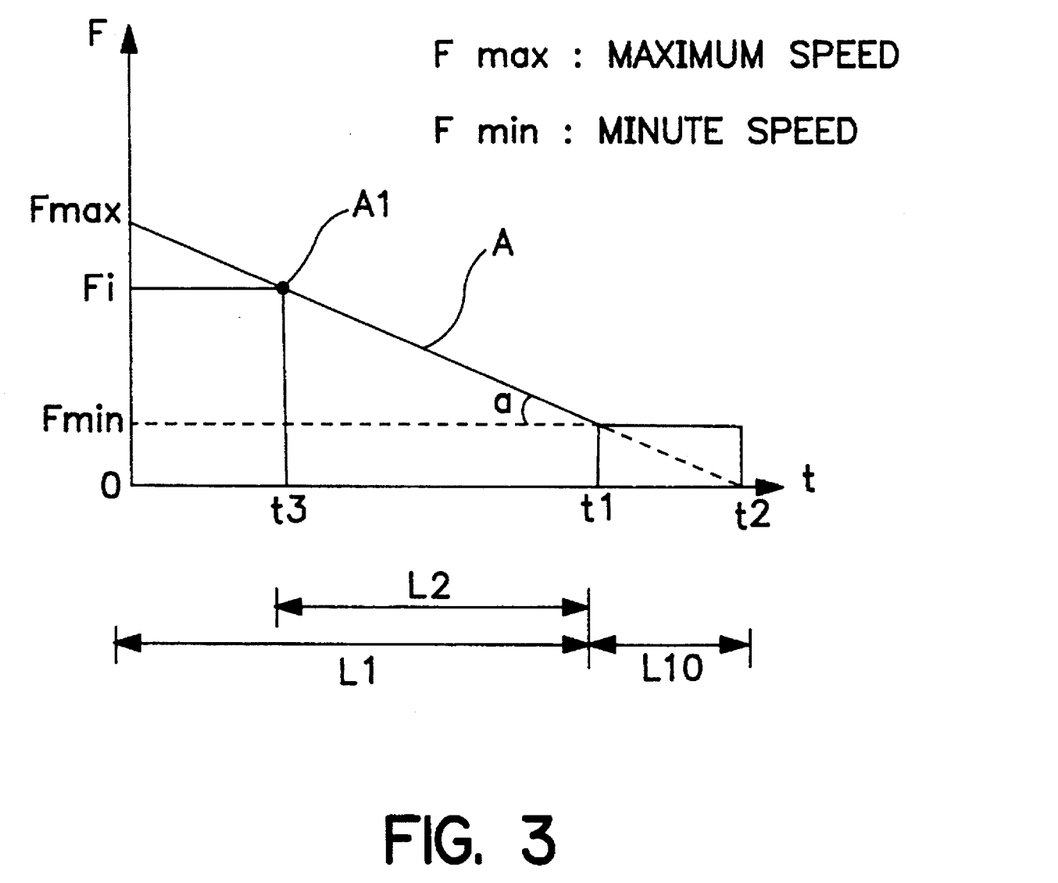
FIG. 3 is a graph explaining a deceleration distance and an acceleration constant when a tool approaches a stroke end.

FIG. 3 is a graph explaining a deceleration distance and an acceleration constant when a tool approaches a stroke end. In FIG. 3, a tool feed speed F is decelerated from a maximum speed $F_{max}$ to a minute speed $F_{min}$ along a line A and reaches the minute speed $F_{min}$ at a time t1 and the tool moves at the minute speed $F_{min}$ up to a time t2. The tool reaches the point P3 of the stroke end 2 at the time t2. A distance L10 which the tool moves from the time t1 to the time t2 can be determined by integrating the tool feed speed F from the time t1 to the time t2. The tool moving along the line A at the feed speed F is kept at the minute speed $F_{min}$ at the start point of the distance L10 in front of the stroke end 2 and moves to the vicinity of the stroke end 2 at the minute speed $F_{min}$.

The maximum speed $F_{max}$ is changed to the minute speed $F_{min}$ by an acceleration constant α set to a given value. A deceleration distance L needed to decelerate to the minute speed $F_{min}$ is determined using the acceleration constant α. A deceleration distance L1 from the maximum speed $F_{max}$ to the minute speed $F_{min}$ can be determined by integrating the tool feed speed F from a time 0 to the time t1. Further, when the tool feed speed F is Fi ($<F_{max}$), a deceleration distance L2 from the feed speed Fi to the minute speed $F_{min}$ can be determined by integrating the tool feed speed F from a time t3 when the feed speed F becomes the feed speed Fi to the time t1 along the line A.

Figure 4:
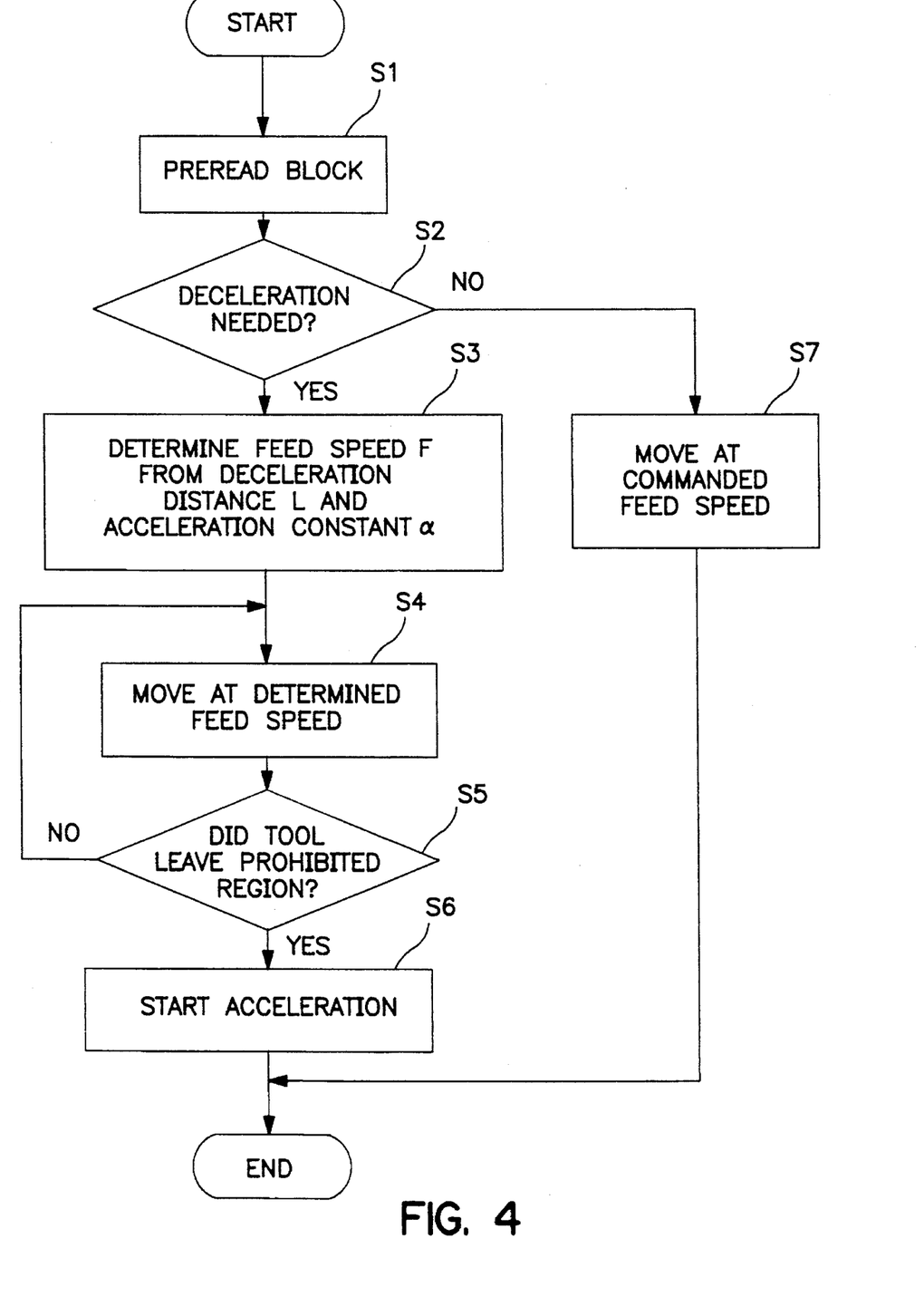
FIG. 4 is a flowchart showing a processing sequence of the present invention.

FIG. 4 is a flowchart showing a processing sequence of the present invention. In FIG. 4, each numeral of the letter "S" represents a step number. [S1] A machining block is preread. [S2] It is determined whether deceleration is necessary or not. That is, it is determined from the preread machining block whether or not the tool moves at the feed speed F greater than the feed speed $F_{min}$ in the vicinity of the stroke end 2 (region within the distance L10 from the stroke end 2) when the machining block is executed. When it is determined that deceleration is necessary because the feed speed F is greater than the minute speed $F_{min}$, the process goes to step S3, and if not so, the process goes to step S7. [S3] The deceleration distance L is set by the aforesaid method from the feed speed data of the preread machining block and the feed speed F is determined using the thus set deceleration distance L and the acceleration constant α. [S4] The tool is moved at the determined feed speed F. [S5] It is determined whether the tool has left the stroke end 2 or not. When the tool leaves the stroke end 2, the process goes to step S6, and if not, the process returns to step S4. [S6] According to step 6 the tool has left the stroke end 2, and acceleration is started to carry out usual feed speed control. [S7] Usual feed speed control is carried out at the control feed speed F controlled in the machining blocks.

Figure 1A:
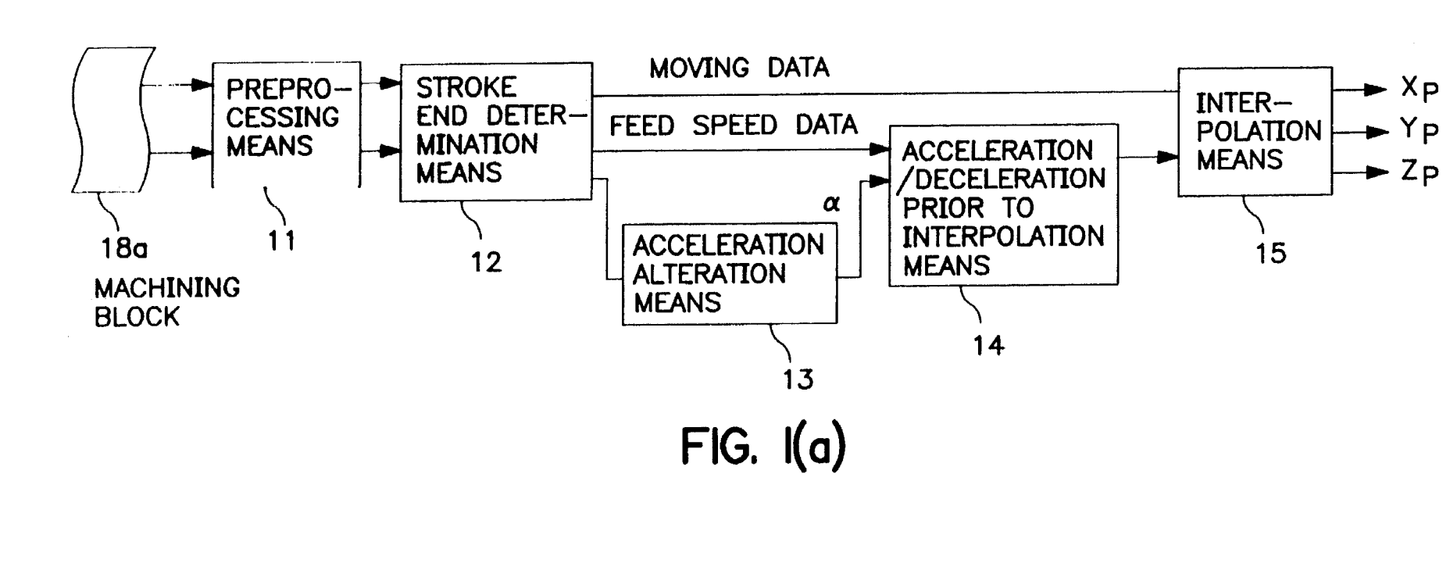
FIG. 1 is a diagram showing an overall arrangement of an acceleration/deceleration control apparatus of a numerical control apparatus according to the present invention.
Figure 1B:
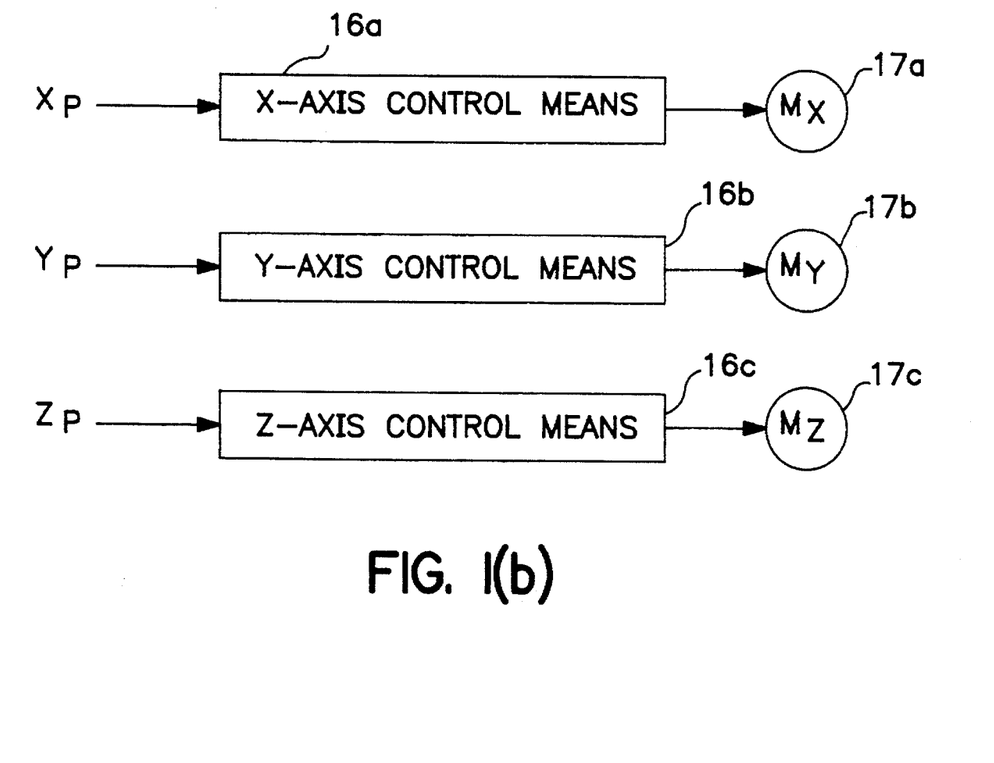

FIG. 1 is a diagram showing an overall arrangement of an acceleration/deceleration control apparatus for a numerical control apparatus according to the present invention. In FIG. 1, preprocessing means 11 of the numerical control apparatus reads a machining block 18a and supplies the read machining block data (movement data and feed speed data) to stroke end determination means 12. The stroke end determination means 12 determines whether the tool moves beyond the stroke end 2 or not from the machining block data. When the stroke end determination means 12 determines that the tool does not move beyond the stroke end 2 because the feed speed F in the vicinity of the stroke end 2 is equal to or less than the minute speed $F_{min}$, the movement data of the machining block data is supplied to interpolation means 15 and the feed speed data is supplied to "acceleration/deceleration prior to interpolation" means 14 as is.

On the other hand, when the stroke end determination means 12 determines that the tool moves beyond the stroke end 2, because the feed speed F in the vicinity of the stroke end 2 is greater than the minute speed $F_{min}$, the stroke end determination means 12 supplies the result of determination to "acceleration alteration" means 13. Further, the stroke end determination means 12 supplies the feed speed data of the machining block to the "acceleration/deceleration" prior to interpolation means 14.

On receiving the result of determination of the stroke end determination means 12, the "acceleration alteration" means 13 alters an acceleration prior to interpolation of the preset acceleration constant a and supplies the "acceleration constant α to the acceleration/deceleration prior to interpolation" means 14. The feed speed data of the machining block data is supplied to the acceleration alternation means 13, whereas the moving data thereof is supplied to the interpolation means 15.

The "acceleration/deceleration prior to interpolation" means 14 subjects the feed speed data supplied from the stroke end determination means 12 to acceleration/deceleration processing. The acceleration/deceleration processing is carried out based on an acceleration prior to interpolation and the above acceleration constant α. The speed subjected to the acceleration processing is supplied to the interpolation means 15 as speed data multiplied by a linear acceleration/ deceleration. The interpolation means 15 determines pulses Xp, Yp, Zp to be distributed to X-, Y- and Z-axes, respectively based on the speed data and the movement data supplied through the stroke end determination means 12.

The distributed pulses Xp, Yp, Zp are supplied to X-axis control means 16a, Y-axis control means 16b, and Z-axis control means 16c, respectively and output to motors Mx, My and Mz of the respective axes of a machine tool to execute the drive control of the motors. Note, the "acceleration alteration" means 13, the "acceleration/deceleration prior to interpolation" means 14 and the interpolation means 15 function as tool feed speed control means for controlling a tool feed to the minute speed $F_{min}$ based on a result of determination by the stroke end determination means 12 that the tool moves beyond the stroke end 2.

As described above, since the tool feed speed F is kept to the minute speed $F_{min}$ in the vicinity of the stroke end 2, a tool can be moved by making maximum use of a stroke and thus a region machinable to the intrinsic stroke of a machine tool can be secured.

As described above, according to the present invention, the tool feed speed is kept to the minute speed in the vicinity of the stroke end, the tool can be moved by making maximum use of the stroke so that a region machinable to the intrinsic stroke of a machine tool can be secured.

We claim:

1. An acceleration/deceleration control apparatus for a numerical control apparatus which controls a tool in a vicinity of a stroke end, comprising:

stroke end determination means for determining whether said tool moves beyond said stroke end by prereading a machining block before said tool reaches the vicinity of said stroke end;

tool feed speed control means for controlling a feed speed of said tool in response to said stroke end determination means such that the feed speed of said tool is reduced to a minute speed in the vicinity of said stroke end; and interpolation means for determining first, second and third pulses, respectively supplied to first axis control means, second axis control means and third axis control means to thereby execute drive control of said tool.

2. An acceleration/deceleration control apparatus for a numerical control apparatus according to claim 1, wherein said tool feed speed control means determines the feed speed of said tool using a deceleration distance determined from a maximum feed speed of said tool, said minute speed and an acceleration constant.

3. An acceleration/deceleration control apparatus for control of a tool in a vicinity of a stroke end, comprising:

axis control means for controlling axial movement of said tool;

stroke end determination means for determining if said tool moves beyond the stroke end before said tool reaches the vicinity of the stroke end;

acceleration alteration means for outputting an acceleration value in response to a determination by said stroke end determination means that said tool moves beyond the stroke end;

means, responsive to said acceleration value and a determination by said stroke end determination means that said tool moves beyond the stroke end, for determining pulses to be distributed to said axis control means which reduce the acceleration of said tool in the vicinity of the stroke end; and interpolation means for determining first, second and third pulses, respectively supplied to first axis control means, second axis control means and third axis control means to thereby execute drive control of said tool.

4. The acceleration/deceleration control apparatus according to claim 3, further comprising:

preprocessing means for reading a machining block to be executed by the tool and supplying read machining block data to said stroke end determination means corresponding to the read machining block.

5. The acceleration/deceleration control apparatus according to claim 3, wherein said means responsive to said acceleration value further comprises:

means for receiving the acceleration value from the acceleration alteration means and feed speed data from said stroke end determination means, and for outputting data to said interpolation means in response thereto.

6. An acceleration/deceleration control apparatus for control of a tool in a vicinity of a stroke end, comprising:

preprocessing means for reading a machining block to be executed by the tool and outputting read machining block data;

stroke end determination means for determining if the tool moves beyond the stroke end in response to the read machining block data before the tool reaches the vicinity of the stroke end;

acceleration alteration means for outputting an acceleration value in response to a determination by said stroke end determination means that the tool moves beyond the stroke end;

interpolation means for determining first, second and third pulses, respectively supplied to first axis control means, second axis control means and third axis control means to thereby execute drive control of the tool; and means for receiving the acceleration value from said acceleration alteration means and feed speed data from said stroke end determination means, and for outputting data to said interpolation means in response thereto.

* * * * *

UNITED STATES PATENT AND TRADEMARK OFFICE
CERTIFICATE OF CORRECTION

Page 1 of 2

PATENT NO. : 5,589,750
DATED : December 31, 1996
INVENTOR(S) : Takashi IDEI, et al.

It is certified that error appears in the above-indentified patent and that said Letters Patent is hereby corrected as shown below:

| | | |
|---|---|---|
| COL. 1, | line 53, | after "at" insert --a-- |
| COL. 2, | line 67, | start a new paragraph with "[S1]" |
| COL. 3, | line 1, | start a new paragraph with "[S2]" |
| | line 10, | start a new paragraph with "[S3]" |
| | line 13, | start a new paragraph with "[S4]" |
| | line 14, | start a new paragraph with "[S5]" |
| | line 16, | start a new paragraph with "[S6]" |
| | line 17, | after "step 6" insert --,-- |
| | line 19, | start a new paragraph with "[S7]" |
| | line 44, | change ""acceleration/deceleration"" to --"acceleration/deceleration-- |
| | line 45, | change "interpolation" to --interpolation"-- |

UNITED STATES PATENT AND TRADEMARK OFFICE
CERTIFICATE OF CORRECTION

PATENT NO. : 5,589,750
DATED : December 31, 1996
INVENTOR(S) : Takashi Idei, et. al.

It is certified that error appears in the above-indentified patent and that said Letters Patent is hereby corrected as shown below:

line 51, change "acceleration/deceleration" to-- "acceleration/deceleration--.

Signed and Sealed this

Eleventh Day of March, 1997

Attest:

BRUCE LEHMAN

*Attesting Officer*  *Commissioner of Patents and Trademarks*